(12) United States Patent
Hillebrecht et al.

(10) Patent No.: US 10,286,961 B2
(45) Date of Patent: May 14, 2019

(54) LIGHTWEIGHT VEHICLE STRUCTURE FLEXIBLY MANUFACTURED

(71) Applicants: EDAG Engineering GmbH, Wiesbaden (DE); LZN Laser Zentrum Nord GmbH, Hamburg (DE); Concept Laser GmbH, Lichtenfels (DE); BLM S.P.A., Cantú (CO) (IT)

(72) Inventors: Martin Hillebrecht, Petersberg (DE); Michael Schmidt, Flieden (DE); Eric Fritzsche, Fulda (DE); Frank Breitenbach, Künzell (DE); Claus Emmelmann, Seevetal-Horst (DE); Frank Herzog, Lichtenfels (DE); Sergio Raso, Turin (IT)

(73) Assignees: EDAG ENGINEERING GMBH, Wiesbaden (DE); LZN LASER ZENTRUM NORD GMBH, Hamburg (DE); CONCEPT LASER GMBH, Lichtenfels (DE); BLM S.P.A., Cantú (IT)

( * ) Notice: Subject to any disclaimer, the term of this patent is extended or adjusted under 35 U.S.C. 154(b) by 96 days.

(21) Appl. No.: 15/248,798

(22) Filed: Aug. 26, 2016

(65) Prior Publication Data

US 2017/0057558 A1  Mar. 2, 2017

(30) Foreign Application Priority Data

Aug. 28, 2015  (EP) .................................... 15182959

(51) Int. Cl.
*B62D 27/02* (2006.01)
*B22F 3/105* (2006.01)
(Continued)

(52) U.S. Cl.
CPC .......... *B62D 27/023* (2013.01); *B22F 3/1055* (2013.01); *B22F 5/10* (2013.01);
(Continued)

(58) Field of Classification Search
CPC ........ B62D 21/02; B62D 25/04; B62D 25/06; B62D 25/08; B62D 25/081; B62D 27/023;
(Continued)

(56) References Cited

U.S. PATENT DOCUMENTS

| 4,618,163 A | 10/1986 | Hasler et al. |
| 5,458,393 A * | 10/1995 | Benedyk ............... B62D 23/005 280/798 |

(Continued)

FOREIGN PATENT DOCUMENTS

DE  102011012248 A1 * 1/2012 ........... B62D 21/152
EP  0 146 716 A2  7/1985
(Continued)

OTHER PUBLICATIONS

Extended European Search Report dated Feb. 12, 2016, by the European Patent Office in corresponding European Patent Application No. 15182959.5-1755.

*Primary Examiner* — Jason S Daniels
(74) *Attorney, Agent, or Firm* — Buchanan Ingersoll & Rooney PC

(57) ABSTRACT

A body node for connecting shell-shaped body structures, of a vehicle, the body node having: a first connecting flange for connection to a first shell-shaped body structure, a second connecting flange for connection to a second shell-shaped body structure, a third connecting flange for connection to a third shell-shaped body structure, and a connecting structure
(Continued)

rigidly connecting the connecting flanges with each other and, for example, forming a monolithic body with the connecting flanges.

21 Claims, 4 Drawing Sheets

(51) Int. Cl.
    *B22F 5/10*     (2006.01)
    *B62D 21/02*     (2006.01)
    *B62D 29/00*     (2006.01)
    *B62D 65/02*     (2006.01)

(52) U.S. Cl.
    CPC ........... *B62D 21/02* (2013.01); *B62D 29/008* (2013.01); *B62D 65/02* (2013.01)

(58) Field of Classification Search
    CPC ..... B62D 29/008; B62D 65/02; B22F 3/1055; B22F 5/10
    USPC ................................ 296/29, 30, 203.01, 205
    See application file for complete search history.

(56) References Cited

U.S. PATENT DOCUMENTS

| | | | |
|---|---|---|---|
| 5,480,208 A | | 1/1996 | Cobes et al. |
| 6,010,182 A | * | 1/2000 | Townsend .............. B62D 21/12 296/191 |
| 2002/0043814 A1 | | 4/2002 | Weiman |
| 2002/0050064 A1 | | 5/2002 | Furuse et al. |
| 2007/0246972 A1 | | 10/2007 | Favaretto |
| 2011/0158741 A1 | * | 6/2011 | Knaebel ............... B62D 23/005 403/265 |
| 2016/0016229 A1 | * | 1/2016 | Czinger ................ B22F 3/1055 296/205 |
| 2016/0297479 A1 | * | 10/2016 | Ritschel ............... B62D 27/023 |

FOREIGN PATENT DOCUMENTS

| | | |
|---|---|---|
| EP | 2 617 629 A1 | 7/2013 |
| EP | 2801512 A1 | 11/2014 |
| JP | 05305878 A | 11/1993 |
| JP | 06-33922 A | 2/1994 |
| JP | 2006272393 A | 10/2006 |
| WO | WO 95/30563 A1 | 11/1995 |
| WO | WO 00/61424 A1 | 10/2000 |
| WO | WO 2005/061311 A1 | 7/2005 |
| WO | WO 2015/111706 A1 | 7/2015 |

* cited by examiner

LIGHTWEIGHT VEHICLE STRUCTURE FLEXIBLY MANUFACTURED

The invention relates to a lightweight vehicle structure, in particular a functionally integrated lightweight hybrid vehicle structure which is flexibly manufactured. The inventive design can be applied in vehicles, particularly motor vehicles. Basically, the illustrated design and the manufacturing concept can be used on bodies or components for heavy and light commercial vehicles, mobile machinery or generally for space frame structures or rod-node supporting structures for machinery and equipment and can be applied advantageously to the fields of passenger cars, commercial vehicles, rail vehicles, machinery, aircraft and space technology, medicine, etc.

Bodies in space frame construction, i.e., in a lattice frame construction are known from the prior art. Variously shaped extrusion and sheet profiles can form the frame structure, which are connected by nodes such as cast nodes in highly stressed points.

From EP 2 617 629 A1, a body node for joining shell-like body structures of a vehicle is known. A base wall structure and a reinforcing rib of the body node are formed together as a thin walled metal casting body in a casting process.

EP 2 801 512 A1 discloses a composite structure comprising a base structure, forming a body node of a vehicle body, and a generatively formed functional structure that mechanically reinforces the body node and the base structure, so that overall a high-strength composite structure having low weight is obtained.

Generative manufacturing methods as such are known to a person skilled in the art, such as laser additive manufacturing methods (LAM), in particular selective laser melting (SLM) and selective laser sintering (SLS).

It is an object of the invention to provide a vehicle node, a body section of a body and a manufacturing method for the body node or the body section, wherein the body node or the body section are to be improved structurally, in particular with respect to lightweight design and stability.

This object is achieved by the subject matter of the independent claims. Advantageous further developments are apparent from the dependent claims, the description and the figures.

The invention relates to a body node for connecting body structures, in particular shell-shaped body structures, of a vehicle, in particular a motor vehicle. The body node is preferably part of a self-supporting structure of a vehicle, in particular in space frame or rod structure construction. A shell-shaped body structure is considered to be a body structure having a thin-walled structure, such as a wall or a sheet, which in cross-section, such as across the longitudinal direction of the body structure, is bent or curved at least once, e.g., several times, and/or has a closed or open cross section. The body node is adapted to absorb forces and moments of body structures attached or connected to it. The body node rigidly connects the body structures attached to it. The body structures which are shell-shaped, for example, can preferably be regarded as elongate, idealized, for example, as rods or bars from the perspective of engineering mechanics. At least one, several or all of the body structures herein can be formed shell-shaped or box-shaped. A box-shaped body structure, which is a special case of a shell-shaped body structure, is, for example, considered to be a tubular or prismatic, in particular a thin-walled, hollow profile that surrounds a hollow space at least over the largest part of its periphery. Although the shell-shaped or box-shaped body structure preferably has a closed cross-section, it may, in principle, also have an open cross-section, wherein the shell-shaped or box-shaped body structure can enclose the cavity on at least three, preferably four sides. The body structure can be bent once or several times over its circumference. Generally, the body structure may be shaped regularly or irregularly prismatic or tubular. Due to this shaping, in particular the design of the body structure as a shell-shaped or box-shaped hollow body, the body structure has a high torsional and flexural stiffness.

At least one, several or all of the body structures can be an extruded profile or a profile composed of one or more sheets. Preferably, such a profile forms said shell-shaped or box-shaped body structure. Alternatively, the shell-shaped or box-shaped body structure may be manufactured by means of a generative manufacturing process or another primary shaping method such as casting. For completeness, it should be mentioned that not all body structures attached to the body node must be manufactured using the same construction method. For example, one body structure may be manufactured using one of said construction methods and another body structure may be manufactured using a different one of said construction methods.

The body node has a first connecting flange for connection to a first body structure and at least one further connecting flange for connection to at least one other body structure. In particular, the body node has a first connecting flange for connection to a first body structure, a second connecting flange for connection to a second body structure, and a third connecting flange for connecting to a third body structure. In this context, the term connection also includes attachment, i.e., the connecting flange is provided for attachment to the respective body structure. Optionally, the body node may include a fourth or even a fifth or, generally, an nth connecting flange for connection to a fourth, fifth or nth body structure. The number of connecting flanges results from the requirement of the number of body structures which are to be connected to the body nodes.

The body node includes a connecting structure rigidly connecting the connecting flanges of the body node. Preferably, the connecting structure forms together with the connecting flanges of the body node a monolithic, i.e., a one-piece body, which advantageously can be handled as a single body. In general, the body node could also consist of several parts such as casting and/or sheet parts, which are rigidly connected to one another and thus also form a unit which can be handled as a whole.

In embodiments of the invention, the body node may have been manufactured or may be manufactured generatively, in particular by means of a laser additive production process such as a selective laser melting process or a selective laser sintering process. In principle, any generative manufacturing method is an option for the generation of the body node. Synonymously with generative forming or manufacturing, additive forming or manufacturing may be used. Preferably, the entire body node including the connecting structure and the connecting flanges is formed by means of a laser in a generative or additive way. The laser additive manufacturing comprises the methods "Direct Metal Laser Sintering" (DMLS), "Selective Laser Melting" (SLM), "Laser Cusing", "Selective Laser Sintering" (SLS), or laser generation. This method or these methods are already used industrially to produce loadable functional components in a metallic powder bed without tools. As an alternative to the powder bed method a laser powder build-up welding is an option for the generative manufacturing. In particular, the range of materials comprises metallic materials, such as iron and steel, aluminium and titanium alloys, but is not limited to that, since the usable materials or alloys are constantly being expanded. Alternatively, the structure node may be produced by means of additive manufacturing of a plastic material, in particular a structurally relevant plastic material with or without fibre reinforcement.

The method is based on a 3D CAD model of the component to be manufactured, in particular the structure node. The component to be manufactured is placed in a virtual space, divided into individual layers and stored as layer information. Typical layer thicknesses are, for example, between 30 and 60 microns depending on the material and the manufacturing facility, but can also be smaller or greater. The actual manufacturing process may comprise, for example, three basic steps iteratively repeated until the component is finished. In a first step, a thin layer of powder is melted by the laser according to the current component layer. In a second step, the powder bed is lowered by one layer thickness and, in a third step, a further layer of powder applied on the component layer solidified by the laser. Depending on component size, this cycle is repeated several thousand times until completion. Unmelted powder can be reused almost completely for future construction processes. The densities and strengths of the manufactured component achieved by the method are comparable to the characteristics of conventional cast materials. Compared to conventional manufacturing methods, additive methods, such as laser additive manufacturing, provide the potential to follow new design approaches due to their high inherent geometric freedoms. Therefore, enhanced methods of structural optimization, in particular topology optimization, are applied to the design of lightweight structures for laser additive manufacturing. The goal thereof is to identify, based on numerical methods under given load and boundary conditions, the material with structural relevance in a defined space.

The high degree of design freedom of laser additive manufacturing allows the designer a better implementation of such lightweight optimization results than it is possible with conventional methods due to their manufacturing constraints. It is now possible to implement the bionics in the design process. In particular, structural bionics is of major interest in the context of lightweight construction applications.

The generative manufacturing can be adapted to fluctuating volume requirements of vehicle variants with low logistics effort in a highly flexible way. The structure nodes may, for example, be manufactured in situ for each variant "Just in Sequence". The body structures can also be produced or cut just before manufacturing. It should also be noted that it is possible to respond quickly and easily to new functional requirements during a vehicle life-cycle by updatable structural components, for example, in particular in the structure nodes.

In further developments of the invention, the connecting structure may have at least one topologically optimized portion or may be topologically optimized. A particular optimization goal is that the body node exhibits a high strength at low weight (lightweight). The topologically optimized structure or the topologically optimized portion can contain struts or bars, for example, which may be similar to the structure of the interior of a bird bone or a Victoria water lily. The bars or struts may be arranged in a cavity, which is surrounded by an enveloping wall of the connecting structure. The enveloping wall may be provided with hollows and/or recesses or holes. The bars or struts in the cavity are surrounded by the wall stiffen the wall and are joined to it. The bars or struts can also branch. Generative manufacturing allows for optimizing the bars or struts with respect to the anticipated load conditions acting on the structure nodes, in particular regarding their mechanical stability. Therefore, the body node can be optimized such that it only includes material where it is needed in order not to fail at the anticipated loads. Such optimizations are performed, for example, by means of numerical methods on a CAD model of the component to be manufactured. The wall surrounding the cavity preferably connects the connecting flanges of the body node. Although the bars or struts in the cavity can also connect the connecting flanges, it is preferred, however, that the bars or struts stiffen the wall. The additive manufacturing allows for such a topologically optimized configuration of the connecting structure.

In principle, it also seems also possible to manufacture the body structures or at least one of the body structures which have an elongate shape and form a rod or a bar in the space frame in a generative way, wherein the, in particular box-shaped, cross-section can surround, by means of a peripheral wall optionally provided with recesses and/or holes, a cavity, in which the rods or bars are disposed, which join the wall and thus stiffen the wall, wherein it is preferred that these bars or rods are topologically optimized with respect to lightweight construction.

In further developments of the body node at least one, several or all of the connecting flanges may form an enclosing element, respectively, that encloses the body structure provided for the connection flange on the outer circumference side. In particular, an end portion, in particular of an elongate body structure, is enclosed on an outer circumference side. In particular, the end of the body structure may be inserted into the enclosing element. The enclosing element may enclose the connecting flange completely or partially over the outer circumference.

Alternatively, at least one, several or all of the connecting flanges form a base on which the body structure provided for the connecting flange, in particular an end portion or one end of the body structure is attachable or attached. Thus, the outer circumference of the end portion of the body structure may partially or completely surround the base over its circumference. The body node may, for example, have one or more connecting flanges forming a base and one or more connecting flanges forming an enclosing element.

For example, the enclosing element or the base may be at least formed such that a, preferably elongate, body structure can be secured or is secured form-locking against movements perpendicular to the longitudinal direction or longitudinal axis of the body structure and, optionally, also form-locking against rotation in the longitudinal direction or about the longitudinal axis of the body structure, when the body structure is disposed in the enclosing element or on the base. Thus, the end of the body structure may have a non-circular cross section which prevents rotation of the body structure in the longitudinal direction or around the longitudinal axis of the body structure. The enclosing element may, for example, comprise one or more tabs that form-lockingly secure the end of the body structure against movements perpendicular to the longitudinal axis or direction of the body structure and/or form-lockingly against rotation around the longitudinal axis or direction.

In further developments an end edge of the enclosing element which is formed by the enclosing element and facing away from the connecting structure may extend at least partly obliquely to the circumferential direction of the enclosing element. Thereby it can be achieved, that the total length of the end edge of the enclosing element is greater than the circumference of the enclosing element. Advantageously, this means that a welding seam, by which the connecting flange or the enclosing element is material-lockingly joined, preferably in a lap joint, with the end portion or the outer circumference of the end portion of the body structure, may be made longer than the circumference. Thus, a higher stability of the connection between the connecting flange and the body structure is achieved. Preferably, the weld seam can be a fillet weld.

Generally, it is preferred that the end portion of an elongate body structure which is inserted into the enclosing element or attached to the base is joined material-lockingly to the by means of a weld seam, in particular a fillet weld, to the flange, in particular of the enclosing element or the base.

Alternatively or optionally, the connecting structure may include a first material and at least one of the connecting flanges may include a second material different from the first material or of a different type, wherein the end to be attached to the connecting flange or to be attached to the end portion of the body structure is made of a material which is of the same type as the second material and in particular of a different type from the first material. Of the same type means that the materials can be joined by means of welding; of a different type means that the materials cannot be joined by means of welding or cannot be joined by means of welding in an economically viable way.

Thereby, a multi-material design can be accomplished, which, in particular, can be implemented by additive manufacturing. For this, a highly or extremely strong first material such as a steel material may be selected for the connecting structure, wherein a material can be selected for the connecting flanges, which can be joined material-lockingly, in particular by welding, with the material of the end of the connecting structure to be attached or being attached. For example, the second material and/or the material of, e.g., the end portion of the body structure may be an aluminium material. Alternatively, the first material may be an aluminium material and the second material and/or the material of the end of the body structure to be attached or being attached may be a steel material. Other material combinations seem possible, for example:

| 1. material | 2. material |
| --- | --- |
| Aluminium material | Titanium material |
| Titanium material | Aluminium material |
| Steel material | Titanium material |
| Titanium material | Steel material |

An aluminium material or a titanium material is considered to comprise not only the pure metals, but also their alloys, such as aluminium alloys or titanium alloys.

The body nodes, in particular the connecting structure, may include a docking point such as a standardized docking point or a two hole docking point for receipt by an industrial robot. The industrial robot may receive the body node at the docking point, e.g., for attaching it to the body structures, and may handle it accordingly.

It will be understood, that the body node may be joined to the body structures manually or, preferably, by means of industrial robots. For example, a robot may pick up the body node, while another robot or robot arm picks up, for example, the shell-shaped body structure and inserts the end of the body structure into the enclosing element or attaches it to the base. For this purpose, the robot may include a combination head. By slightly changing the position of the components to be attached with respect to each other, the end of the body structure may also be applied into a tight fit, which is provided by the enclosing element or the base. By means of the robot or another robot the connecting flange may be attached to the body structure, The body node attached to the body structures, in particular the first, second and third body structures, forms a body section for, e.g., self-supporting or lattice frame-shaped bodies (space frame) of a vehicle, in particular of a passenger vehicle.

At least one elongate body structure may be arranged transversally to one or more other body structures. For example, a first body structure may extend perpendicularly to the vehicle longitudinal axis or along the vehicle transversal axis, a second body structure may extend along the vehicle longitudinal axis, and a third body structure may extend along the vehicle vertical axis or along the vehicle longitudinal axis. A fourth body structure may be provided with a fourth connecting flange of the body node and may extend, e.g., along the vehicle vertical axis or along the vehicle longitudinal axis. Extending along the vehicle longitudinal axis is not necessarily understood to mean an extension in parallel to the vehicle longitudinal axis, but also an extension of the longitudinal direction or longitudinal axis of the body structure at least partly along said axis.

For example, the body node may be arranged in the region of the A-, B-, C- or D-pillar of the vehicle body. Alternatively or additionally, the body node may be arranged on the floor side, roof side or between the floor and roof. Of course, the body node may also be used at other points in the body, in particular at points where multiple body structures converge and, for example, undergo a high strength joining.

In further developments, at least one, several or all of said body structures may be selected from a group consisting of: cross beam, longitudinal beam, in particular front side and rear side longitudinal beams, sills, roof side cross rail, hood support, windscreen base, A-pillar, in particular upper A-pillar and lower A-pillar, B-pillar, C-pillar, D-pillar.

The body section or body may, in further developments, comprise a first body node, which can be configured as described herein, and a second body node, which can be configured as described herein. The first body node may be connected to the second body node via one of said body structures, in particular such that the first body node is attached to a first end of the body structure and the second body node is attached to a second end of the body structure. For example, the first body node and the second body node may be arranged on different vehicle or body sides or on the same vehicle or body side, but may be arranged at different longitudinal positions or height positions.

As already mentioned, the components can be welded by a fillet weld in or at the lap joint. The enclosing element or the base of the profile is also known as casing. For example, the end of the body structure may be plugged into the enclosing element or onto the base with a depth of approximately 5 to 20 mm, in particular, e.g., 10 mm. This connection along with an excellent pre-positioning of the components allows the circumferential welding for a great connection length. Likewise, tolerance compensation is possible in case of this type of connection. The body structures are automatically, i.e., by the given geometry of the base, aligned and fixed by the body node, i.e., in particular against translational movements perpendicular to the longitudinal axis or the longitudinal direction and rotational movements about the longitudinal axis or direction.

Since the body structures may have deviations from the desired contour, an adjustment of the connecting flange may be provided, for which the corresponding body structure is provided. In particular, the permissible clearance of, e.g., not more than 0.2 mm for laser welding has to be observed. This results in an advantageous method for manufacturing a body node described herein, wherein a first, second and third body structure are provided. Of at least one, several or all of the body structures, the actual geometry including the actual dimensions is determined. In particular, a deviation from the desired geometry including the desired dimensions of the respective body structure can be determined. This can be performed, e.g., by laser measuring or scanning. The actual geometry including the actual dimensions is adopted as data from the CAD program (computer program) and transmitted in the form of control or/and geometry data to the manufacturing machine. Then, the machine manufactures the connecting flange provided for the individual body structure matching the determined actual geometry including the actual dimensions by means of a generative manufacturing method. The connecting flanges provided for the body structures may, for example, be formed together with the body node, in particular as a monolithic body.

If the self-supporting body, in particular the space frame, is fully assembled, it can, for example, be measured. The contact surfaces for built-in and attached parts such as cockpit or cladding elements can be adhered or welded or printed on the profiles or nodes in the subsequent step for each component, for example, with a 3D printing method or a generative manufacturing method as it is called herein.

The invention has been described with reference to several embodiments and developments. Hereinafter, a preferred embodiment of the invention will be described with reference to the figures. The features disclosed herein advantageously develop the subject matter of the invention individually and in any combination of features. In the drawings.

Figure 1:
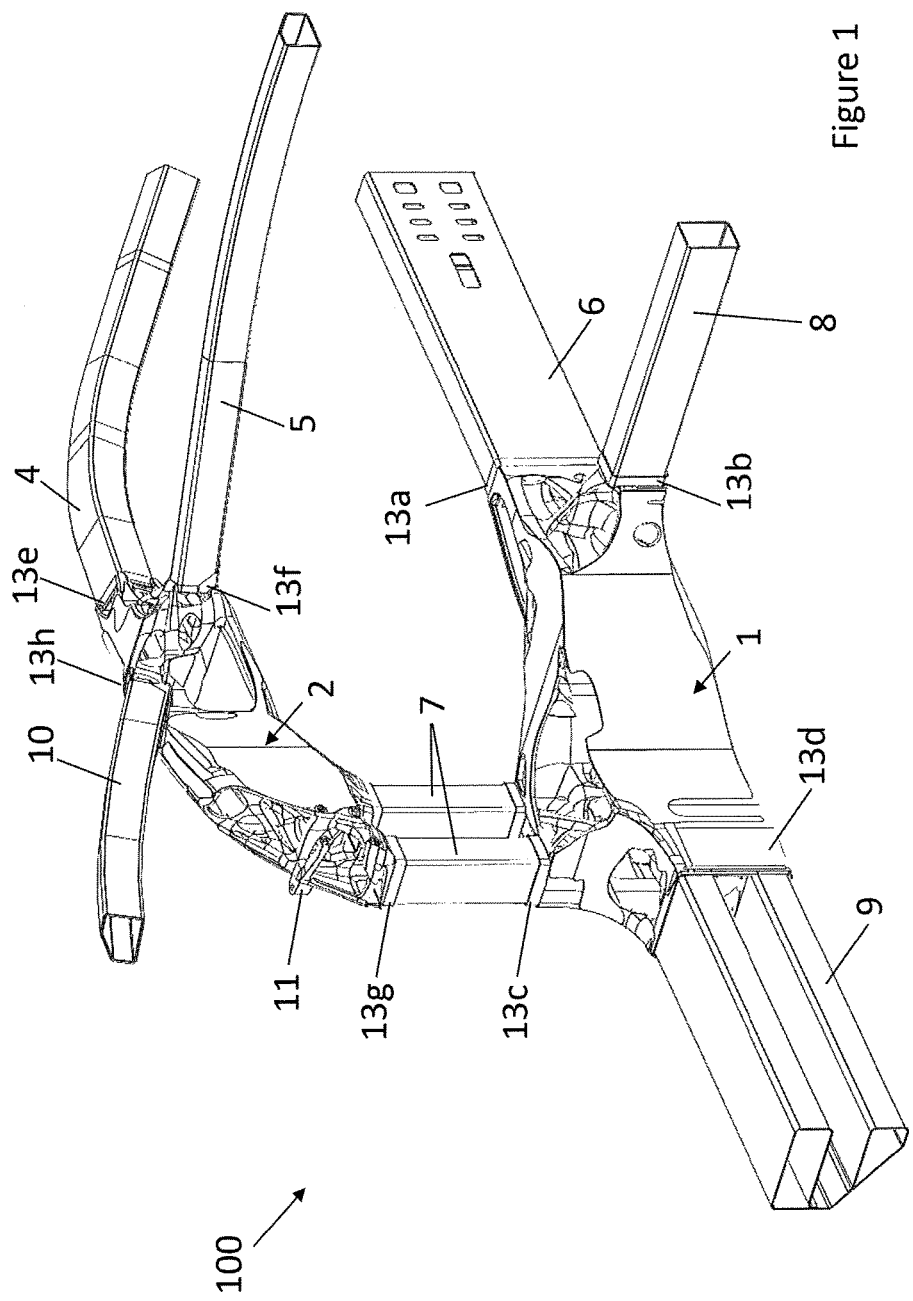
FIG. 1 is a perspective view of a body section of a space frame body.
Figure 2:
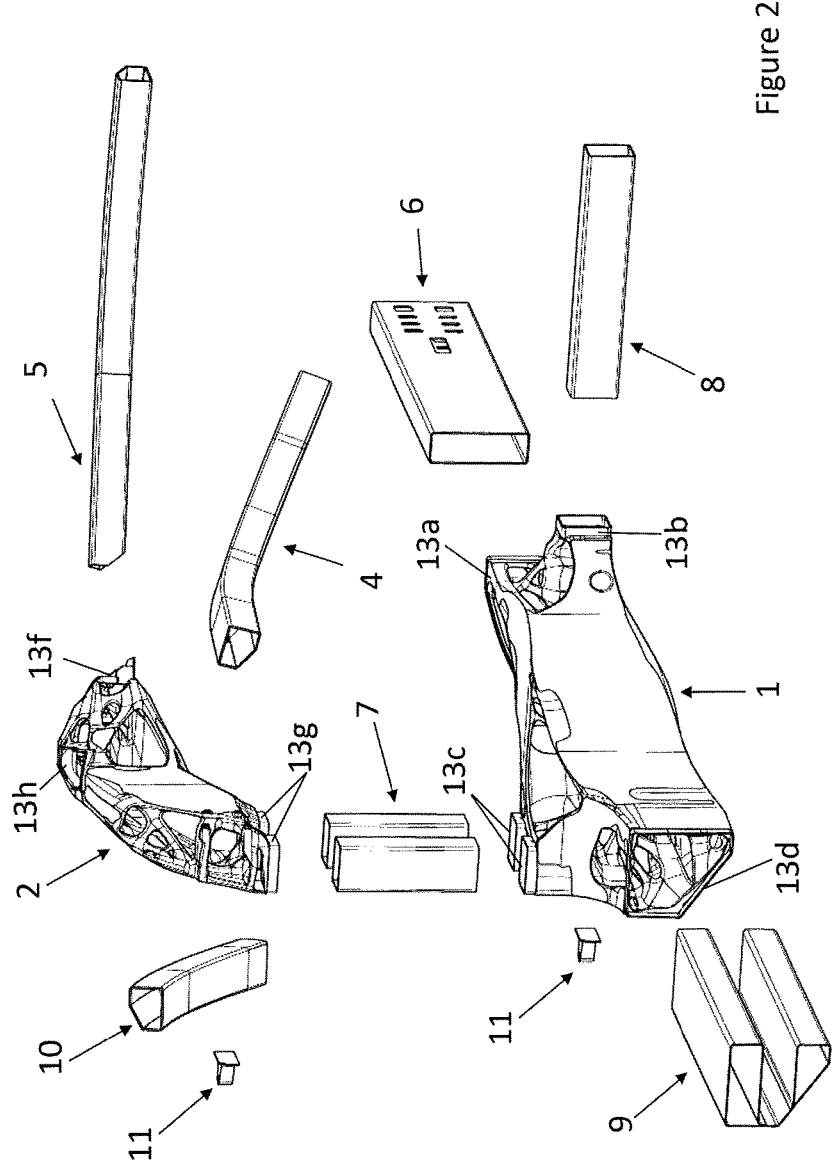
FIG. 2 shows the individual parts of the section of FIG. 1.

FIG. 1 shows, by way of example, a body section 100 in the region of the left A-pillar of a body for a motor vehicle. The body section 100 includes a first body node 1 and a second body node 2 for joining of, e.g., shell-shaped body structures 4, 5, 6, 7, 8, 9, 10. While the first body node 1 and the second body node 2 are different geometrically, they are built similarly with respect to their function and the corresponding functional elements. A reference to details of the first body node 1 thus applies analogously as a reference to the second body node 2 and vice versa.

The first body node 1 includes a first connecting flange 13a for attaching a shell-shaped first connecting structure 6, i.e., a front side longitudinal beam, a second connecting flange 13b for attaching a shell-shaped second body structure 8, i.e., a cross beam extending perpendicularly to the vehicle or body longitudinal axis and connecting, in particular, a corresponding or substantially mirror-inverted body node on the right side of the vehicle to the body node 1 of the left side of the vehicle, and a third connecting flange 13c for attaching a shell-shaped third body structure 7, in particular a lower A-pillar. The third body structure 7 connects the second body node 2 to the first body node 1 and extends approximately in the vertical axis direction of the body or vertically.

The body node 1 further includes a fourth connecting flange 13d for attaching a shell-shaped fourth body structure 9, which extends approximately in parallel to the body longitudinal axis and, in particular, may be a sill.

The second body node 2 includes a first connecting flange 13e for attaching a shell-shaped first body structure 4, in particular a hood support, which extends forward along the body longitudinal axis, downward along the vehicle body vertical axis and inward along the body lateral axis. The body node 2 comprises a second connecting flange 13f for attaching a shell-shaped second body structure 5, in particular a windshield base extending along the body transversal axis. The body node 2 includes a third connecting flange 13g for attaching a shell-shaped third body structure 7, in particular a lower part of the A-pillar extending along the body vertical axis. The body node 2 includes a fourth connecting flange 13h for attaching a shell-shaped fourth body structure 10, in particular an upper part of the A-pillar extending backward along the body longitudinal axis and upward along the body vertical axis.

Figure 3:
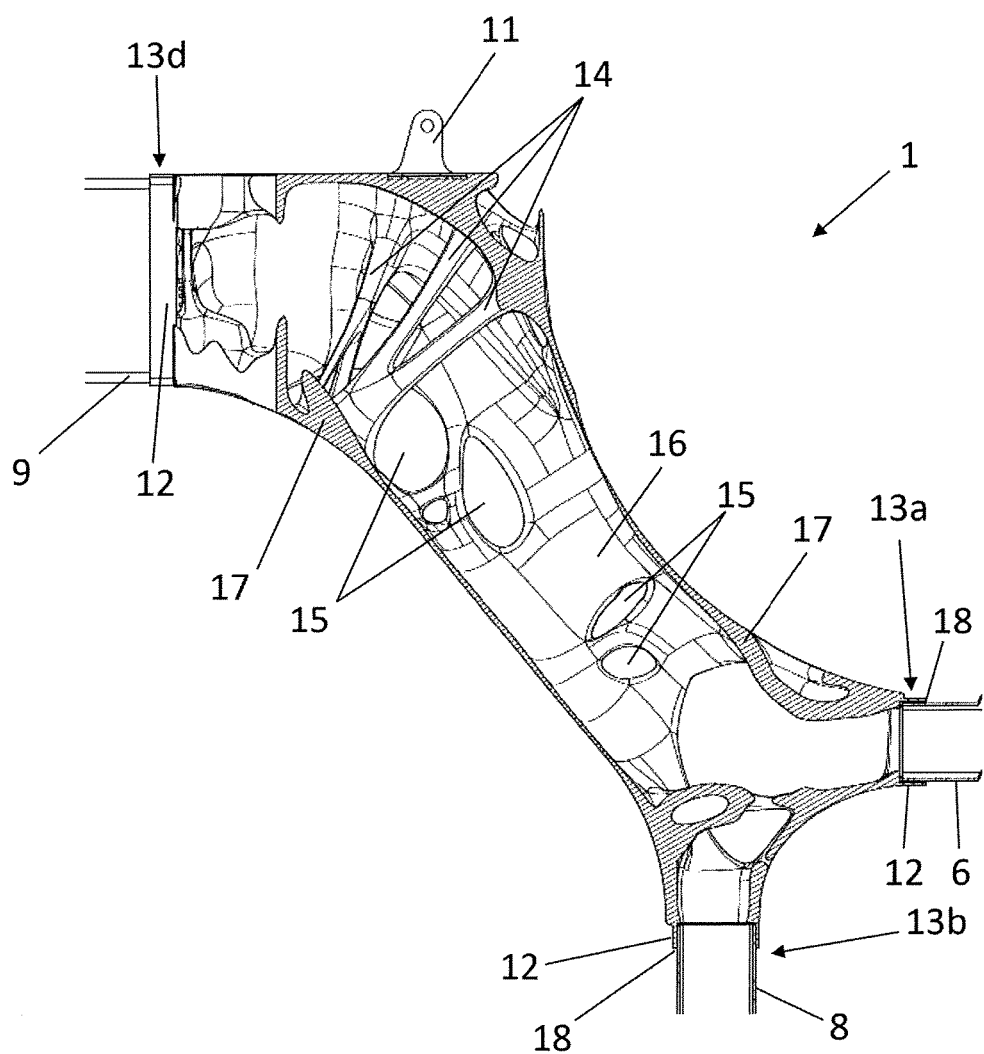
FIG. 3 shows a cross section through a body node of the body section from FIG. 1

The body structures 4, 5, 6, 7, 8, 9, 10 shown are material-lockingly attached to the connecting flanges 13a to 13h provided therefor by means of welding seams 18 (cf. FIG. 3). The welding seams 18 may be made, e.g., by means of laser welding.

Figure 4:
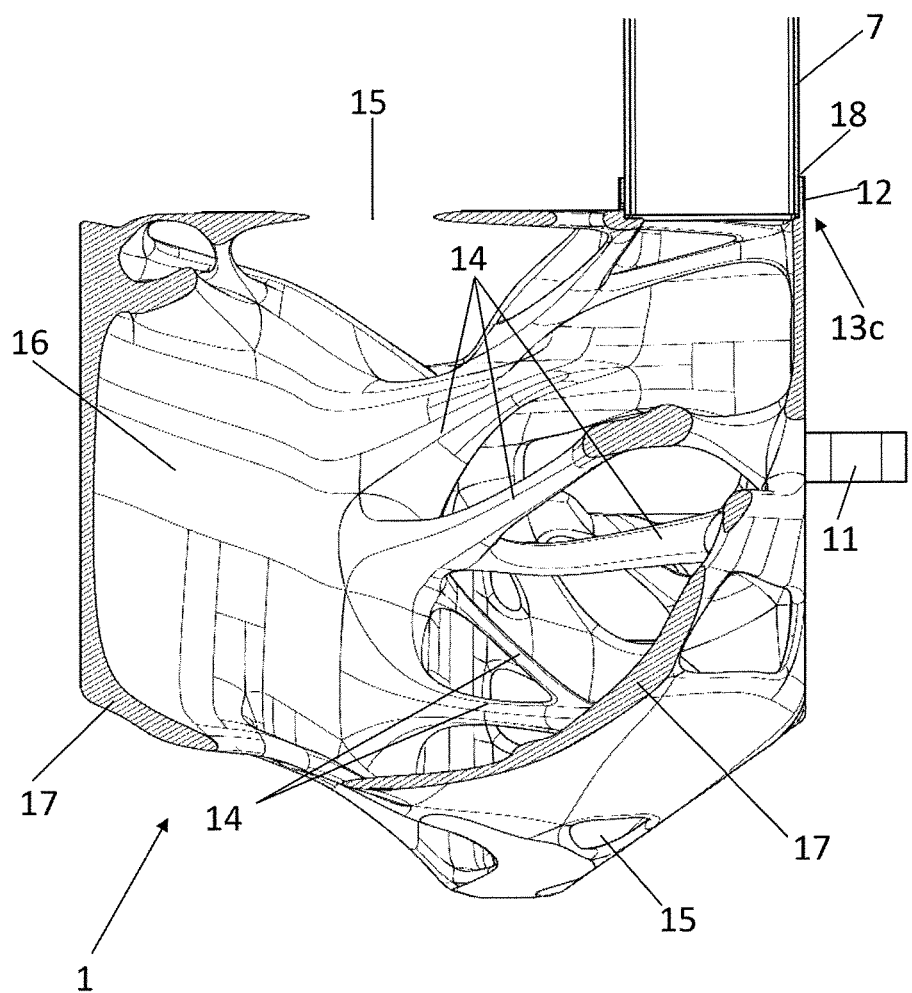
FIG. 4 shows another cross section through the body node of FIG. 1.

As best seen from FIGS. 3 and 4, the connecting flanges 13a to 13d may be connected via a connecting structure 17 which includes a wall enveloping a cavity 16. The enveloping wall may comprise a plurality of recesses or cut-outs 15. In the cavity 16, a plurality of bars 14 joining with the enveloping wall are arranged in the cavity 16, which are encompassed by the connection structure 17.

The connecting structure 17 including its wall enclosing the cavity 16 and the bars 14 is topologically optimized, in particular with respect to a lightweight construction, i.e., for a very high strength at minimum weight. The topologically optimized structure can be determined by numerical methods and manufactured by a generative manufacturing method.

In particular, the statements relating to the connection structure 17 of the first body node 1 apply analogously to the second body node 2, even if the geometry differs from that of the first body node 1.

As best seen in FIGS. 3 and 4, the connecting flanges 13a to 13d include an enclosing element 12 which may also be referred to as casing and forms a wall completely extending over the circumference. The respective enclosing element 12 of the flanges 13a to 13d encloses corresponding body structures 6, 7, 8, 9 on the outer circumference thereof, in particular tightly, such as with a maximum clearing of less than or equal to 0.3 mm or less than or equal to 0.2 mm. The end of the corresponding body structure 6, 7, 8, 9 is inserted into the flange 13a to 13d, wherein the enclosing element 12 is welded to the outer circumference of the end portion of the body structure 6, 7, 8, 9 in lap joint, in particular by means of a partially or completely circumferential weld 18, in particular a fillet weld. The lateral guidance provided by the enclosing element 12 prevents the body structure 6, 7, 8, 9 from moving at all or moving substantially perpendicularly to its longitudinal axis, i.e., apart from play due to the clearance, which is required for inserting the body structure 6, 7, 8, 9 into the flange 13a to 13d. Due to the non-circular, in particular not rotationally symmetrical, cross section of the body structures 6, 7, 8, 9, these are form-lockingly secured against rotation with respect to the flange 13a to 13d. The description of the flanges 13a to 13d of the first body node 1 applies analogously to the flanges 13e to 13g of the second body node 2.

At least one, preferably all, of the flanges 13a to 13g have an inwardly projecting shoulder which forms an axial stop for the body structure 4 to 10 associated with the flange 13a to 13g and, in particular, sets or defines a maximum insertion depth of the body structure 4 to 10 in the flange 13a to 13g.

As best seen in FIG. 1, the first body node 1 includes two flanges 13c and the second body node 2 includes two flanges 13g. The body nodes 1 and 2 are connected by two shell-shaped or box-shaped body structures 7, which are in particular formed as an extruded profile. One of the body structures 7 connects one of the connecting flanges 13c to one of the connecting flanges 13g, the other body structure 7 connects the other connecting flange 13c to the other connecting flange 13g.

As seen, for example, from FIGS. 1, 3 and 4, the first body node 1 and/or the second body node 2 may have a tab 11 projecting from the outer side of the body or body section 100, which allows for the part of a joint or hinge for a door to be attached later during the vehicle assembly, in the example shown the driver's door with left-hand drive vehicles or passenger door with right-hand drive vehicles. The tab 11 includes a bore which, in particular, is aligned with the bore of the tab 11 of the other body node 1. The tab 11 may, for example, be formed in a generative manner during the manufacture of the body node 1, 2, or be attached subsequently to the connecting structure 17 of the body node 1, 2, for example, by welding, gluing or by screws or another friction-locking or form-locking connection element.

The invention claimed is:

1. A body node for connecting shell-shaped body structures, of a vehicle, the body node being formed in a generative manner, and comprising:
   a first connecting flange configured for connection to a first shell-shaped body structure,
   a second connecting flange configured for connection to a shell-shaped second body structure;
   a third connecting flange configured for connection to a shell-shaped third body structure; and
   a connecting structure rigidly connecting the first, second and third connecting flanges with each other and forming a monolithic body with the connecting flanges, the connecting structure including a wall enveloping a cavity, and a plurality of struts or bars being arranged in the cavity, joined to and configured to stiffen the enveloping wall.

2. The body node according to claim 1, wherein at least one of the connecting flanges, is configured as an enclosing element for enclosing an end portion of an outer circumferential side of a body structure provided for the connecting flange and including an axial stop for defining a maximum insertion depth of the body structure in the flange.

3. The body node according to claim 2, wherein the enclosing element is formed to secure an elongate body structure form-lockingly against movements perpendicular to a longitudinal direction of the body structure and against rotation around a longitudinal axis of the body structure.

4. The body node according to claim 2, wherein an end edge of the enclosing element formed by the enclosing element and facing away from the connecting structure extends, at least in sections, obliquely to a circumferential direction of the enclosing element.

5. The body node according to claim 1, wherein at least one of the connecting flanges, is configured as a base to which an end portion of a body structure provided for the connecting flange, is to be attached.

6. The body node according to claim 5, wherein the base is formed to secure an elongate body structure form-lockingly against movements perpendicular to a longitudinal direction of the body structure and against rotation around a longitudinal axis of the body structure.

7. The body node according to claim 1, wherein the connecting structure comprises:
   at least one topologically optimized section such that, the topologically optimized section of the body node has a higher strength at a lower weight as compared to a section of the body node which has not been topologically optimized.

8. The body node according to claim 1, wherein the enveloping wall includes one or more recesses or more cut-outs.

9. A body section for a, self-supporting or lattice frame-shaped body of a vehicle, wherein the body section includes at least one body node according to claim 1, and a plurality of shell-shaped body structures, wherein the body section comprises:
   the first body structure attached to the first connecting flange;
   the second body structure attached to the second connecting flange; and
   the third body structure attached to the third connecting flange.

10. The body section according to claim 9, wherein at least one of the body structures is box-shaped, with a closed cross section, and/or is elongate.

11. The body section according to claim 9, wherein at least one of the body structures is an extruded profile or a profile composed of one or more sheets.

12. The body section according to claim 9, wherein at least one elongate body structure is arranged transversely with respect to one or more other body structures.

13. The body section according to claim 9, wherein at least one or all of said body structures are selected from the group consisting of the following:
   a hood support,
   a windshield base,
   a longitudinal beam,
   an A-pillar,
   a B-pillar,
   a C-pillar,
   a cross beam, and
   a sill.

14. The body section according to claim 9, wherein at least one of the body structures is joined material-lockingly, to the body node with a connection that is longer than a circumference of the body structure.

15. The body section according to claim 14, wherein the connection is a weld seam.

16. The body section of claim 9, comprising:
   a first body node and a second body node wherein the first body node is connected to the second body node via at least one of the body structures such that the first body node is attached to a first end of the at least one body structure and the second body node is attached to a second end of the at least one body structure.

17. The body section according to claim 9, wherein the frame-shaped body is a motor vehicle frame or a space frame.

18. A method for manufacturing a body node for connecting shell-shaped body structures, of a vehicle, the body node having a first connecting flange configured for connection to a first shell-shaped body structure, a second connecting flange configured for connection to a shell-shaped second body structure; a third connecting flange configured for connection to a shell-shaped third body structure; and a connecting structure rigidly connecting the first, second and third connecting flanges with each other and forming a monolithic body with the connecting flanges, the connecting structure including a wall enveloping a cavity, wherein a plurality of struts or bars joining and configured to stiffen the enveloping wall are arranged in the cavity, the method comprising:

providing a first body structure, a second body structure and a third body structure;

determining for at least one of the first, second and third body structures an actual geometry including actual dimensions and providing the connecting flanges for the at least one body structure; and forming the connecting flanges of the at least one body structure to the actual geometry including the actual dimensions in a generative manner.

19. A method for manufacturing a body node according to claim 18, wherein the body node is manufactured in a generative manner, by at least one of the following methods:

selective laser melting (SLM);
selective laser sintering (SLS);
laser additive manufacturing (LAM); or
laser powder build-up welding.

20. The body node according to claim 19, in combination with at least one of the shell-shaped body structures, wherein the connecting structure comprises:

a first material and at least one of the connecting flanges comprises a second material, which is of a different type than the first material, wherein an end of the at least one body structure is attached to the connecting flange and is made of a material which is of the same type as the second material and, is of a different type than the first material.

21. The method according to claim 18, wherein the forming includes:

forming the connecting flanges of the at least one body structure along with the body node.

* * * * *